United States Patent [19]

Behr

[11] Patent Number: 5,066,444

[45] Date of Patent: Nov. 19, 1991

[54] PROCESS AND APPARATUS FOR REDUCING COLOR CONTAMINATION IN THE PROCESS RECYCLE OF ZIPPERED THERMOPLASTIC BAGS

[75] Inventor: R. Douglas Behr, Midland, Mich.

[73] Assignee: DowBrands Inc., Indianapolis, Ind.

[21] Appl. No.: 548,524

[22] Filed: Jul. 5, 1990

[51] Int. Cl.$^5$ ............................................. B29C 47/04
[52] U.S. Cl. ...................................... 264/171; 156/66; 156/244.11; 156/244.25; 264/167; 264/177.1; 264/177.17; 264/DIG. 69; 425/131.1; 425/133.5; 425/462
[58] Field of Search ................ 264/171, 177.1, 177.16, 264/177.17, DIG. 69, 167; 425/131.1, 133.5, 462; 156/66, 244.11, 244.25

[56] References Cited

U.S. PATENT DOCUMENTS

| | | | |
|---|---|---|---|
| 3,345,444 | 10/1967 | Pratt | 264/171 |
| 3,496,261 | 2/1970 | Parr | 264/176.1 |
| 3,608,013 | 9/1971 | Ingham | 425/132 |
| 3,715,420 | 2/1973 | Kiyono et al. | 264/171 |
| 3,825,383 | 7/1974 | Hoagland | 425/462 |
| 3,924,990 | 12/1975 | Schrenk | 425/131.1 |
| 4,094,947 | 6/1978 | Alfrey, Jr. et al. | 425/131.1 |
| 4,185,951 | 1/1980 | Webermeier et al. | 425/133.5 |

FOREIGN PATENT DOCUMENTS 60-183119  9/1985  Japan ................. 425/133.5

Primary Examiner—Jeffery Thurlow

[57] ABSTRACT

Disclosed are a process and apparatus for eliminating the problem of color contamination during product recycle in the manufacture of reclosable thermoplastic bags having zippers of a color different than that of the remainder of the bag. Process and apparatus for effecting same include extrusion of the colored thermoplastic material from a separate, smaller secondary extruder to avoid process shutdown during recycle, encapsulation of the colored thermoplastic material within the colorless flow melt to enhance transport of the colored flow melt, and placement of a dump valve between the secondary extruder and the feedblock to controllably interrupt the flow of the colored flow melt as desired. Further disclosed are an apparatus and process for effecting encapsulation of the colored flow melt.

16 Claims, 5 Drawing Sheets

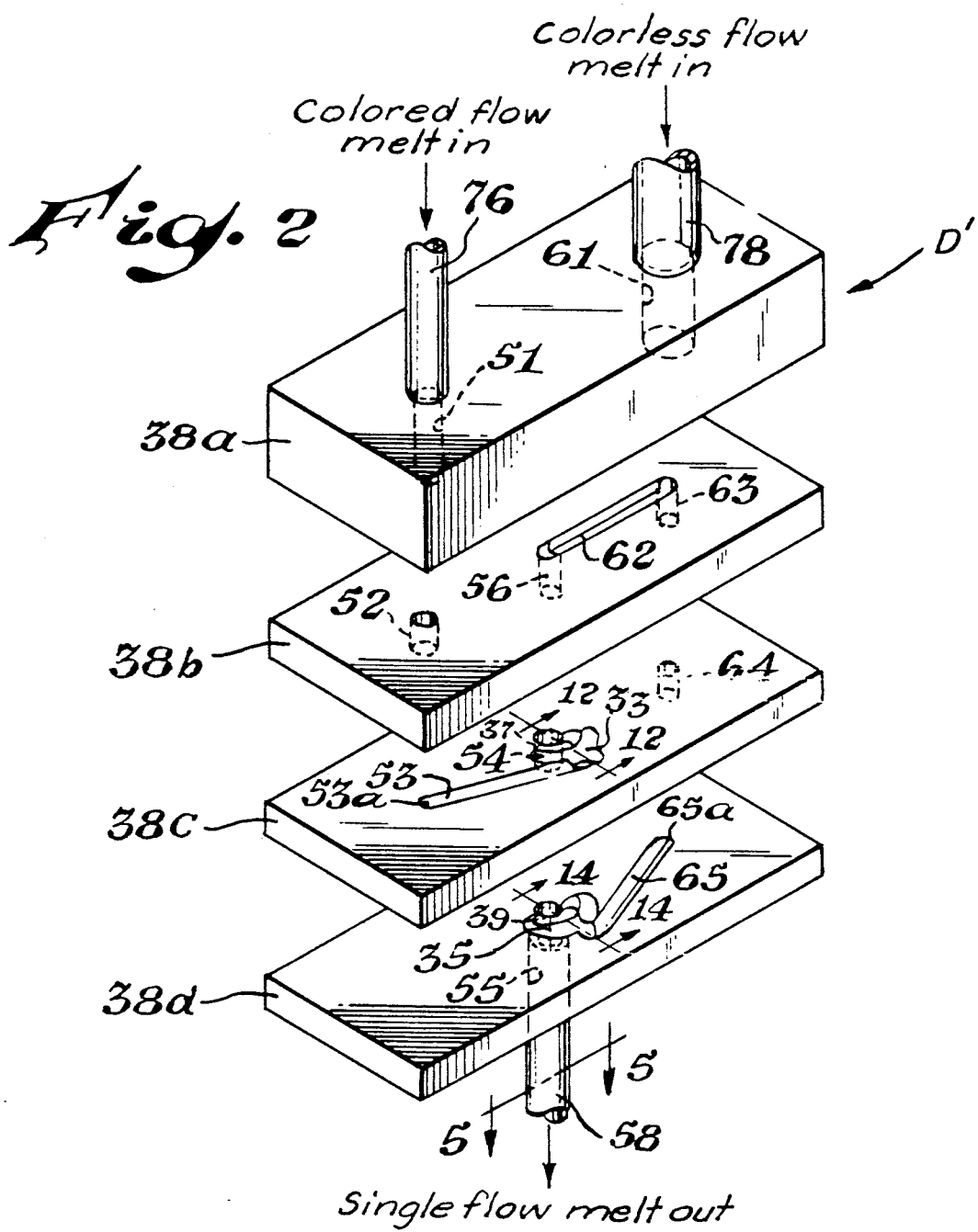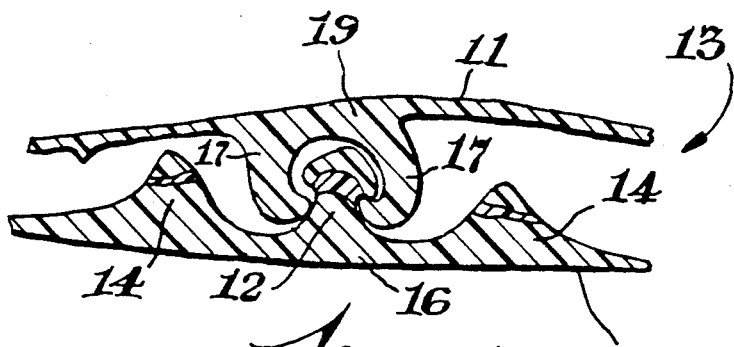

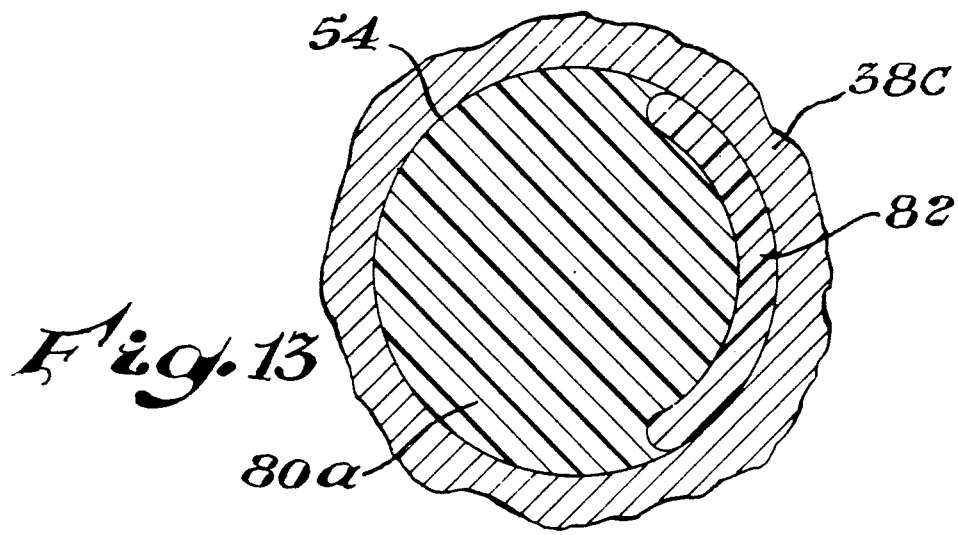
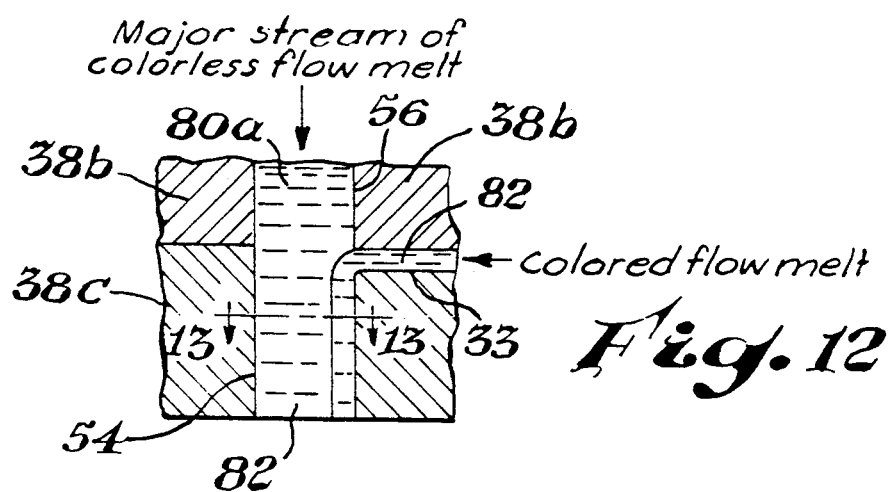
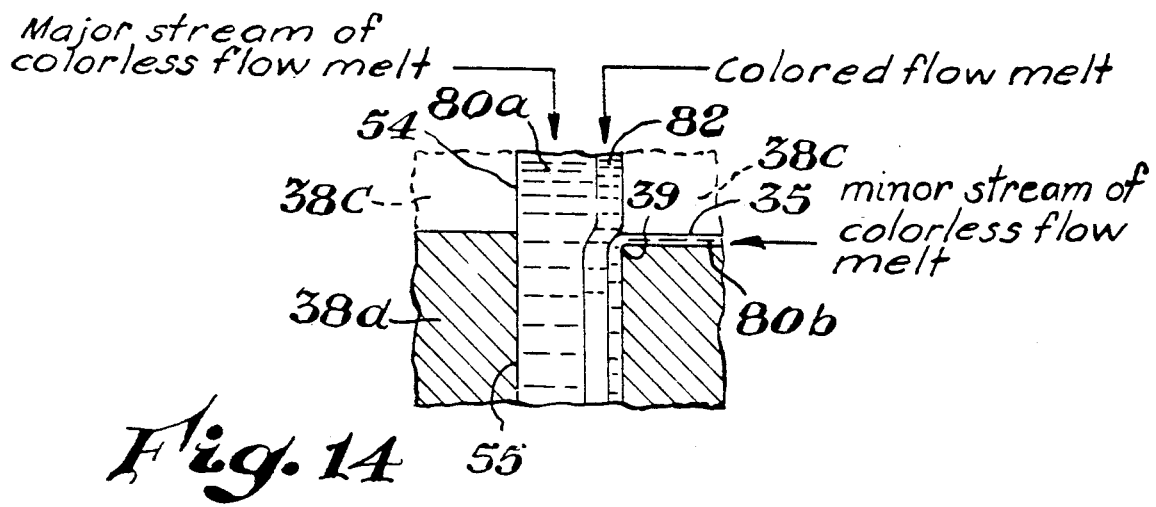

PROCESS AND APPARATUS FOR REDUCING COLOR CONTAMINATION IN THE PROCESS RECYCLE OF ZIPPERED THERMOPLASTIC BAGS

The present invention relates to a process and apparatus for substantially reducing or eliminating color contamination during the course of thermoplastic bag production of such bags having colored zipper profiles upon occasional need to recycle or regrind production output.

Thermoplastic reclosable bags having colored zipper profiles are well known in the art, and are seen by example in U.S. Pat. No(s). 4,186,786 and 4,285,105. A problem associated with the manufacture of such bags with colored zipper profiles is avoidance or minimization of color contamination of freshly extruded bags resulting from the regrind or recycle of out-of-specification bags. Since the bags are typically made of colorless or transparent thermoplastic material, even a relatively small amount of recycled colored thermoplastic material may result in color contamination.

Recycle and regrind of freshly extruded or prior extruded thermoplastic bags is common practice in the manufacture of such bags. Typical recycle proportions may range from about 5 to 25%. Situations necessitating recycle include unacceptable product quality, product or process failure, startup, and shutdown of downstream processing equipment.

One means of reducing color contamination upon recycle of the zippered bags with colored zipper profiles is to slit and separate the entire zipper or the zipper profile having colored portions from the remainder of the bag and recycle only the remainder. This, however, requires additional equipment and procedures to implement, and usually results in waste of the unrecycled thermoplastic material.

Another means of reducing color contamination is to shut off the zipper profile extruder(s) that extrude colored material without shutting off the bag body extruder that extrude colorless material. This however, is usually unsuitable since several minutes will often pass before the color is completely eliminated from both the zipper extruder and the die. Moreover, if the bag production process utilizes the zipper profile or profiles as guiders or trackers for the greater bag film web, elimination of the zipper profiles is not feasible while bag film web production continues.

Accordingly, it would be desirable to have a process and apparatus for making a colored zipper for thermoplastic reclosable bags that allow for recycle of entire bags without substantial color contamination. Desirably, such process and apparatus would not require the separation of the colored zippers from the remainder of the bags. Further, desirably, such process and apparatus would not require cessation of zipper production when bags are being recycled.

SUMMARY OF THE INVENTION

According to the present invention, a process for making a colored zipper profile having distinct colored and colorless material regimes for a zipper for a reclosable, thermoplastic bag comprises providing a continuous flow melt of a colorless thermoplastic material, concurrently providing a continuous flow melt of a colored thermoplastic material while controllably interrupting the flow thereof without interrupting the flow of the colorless flow melt, integrating the colorless and colored flow melts into a combined flow melt having distinct, continuous material regimes, and passing the combined flow melt through a die to form the zipper profile.

According to the present invention, an apparatus for making a colored zipper profile having distinct colored and colorless material regimes for a zipper for a reclosable, thermoplastic bag comprises means for providing a continuous flow melt of a colorless thermoplastic material, means for providing a concurrent, continuous flow melt of a colored thermoplastic material, means for receiving and integrating the colorless and colored flow melts into a combined flow melt having distinct, continuous material regimes, means for controllably initiating and terminating the flow of the colored melt to the receiving and integrating means without interrupting the flow of the colorless flow melt, and a die means for receiving and shaping the combined flow melt into a zipper profile.

According to the present invention, there are two embodiments of the present novel process useful in integrating the colorless and colored flow melts into a combined flow melt. Both embodiments provide for integrating the colorless and colored flow melts by encapsulating the colored flow melt within the colorless flow melt.

One embodiment of the present process for encapsulating a flow melt of a colored thermoplastic material in a flow melt of a colorless thermoplastic material comprises providing a continuous stream of the colorless flow melt, providing a continuous stream of the colored flow melt, dividing the stream of colorless flow melt into a major stream and a minor stream wherein each has a perimeter defined by a fluid passageway having a defining wall, directing the stream of colored flow melt into the major stream of colorless flow melt along a portion of the perimeter thereof contiguous to the defining wall of the fluid passageway therefor, and thereafter directing the minor stream of colorless flow melt into the major stream along a portion of the perimeter thereof and contiguous to and between the stream of colored melt therein and the defining wall of the fluid passageway for the major stream so as to encapsulate the colored flow melt within the colorless flow melt.

Another embodiment of a process for encapsulating a continuous flow melt of a colored thermoplastic material in a continuous flow melt of a colorless thermoplastic material comprises delivering a stream of the colorless flow melt from a second borehole into a transition section of a first borehole and thence into and through a narrower section thereof while simultaneously discharging a stream of the colored flow melt from an outlet of a delivery means positioned within the stream of colorless flow melt. The second borehole intersecting the first borehole generally transversely. The delivery means extends downstream through the transition section into the narrower section. The colorless flow melt flowing transversely into the transition section and impinges upon the delivery means, flows around and entirely surrounds the delivery means as the flow melt traverses the first borehole. The delivery means is inwardly tapered along a portion of its length to the outlet thereof and positioned to present a tapered surface to the flow of colorless flow melt directed into the transition section from the second borehole. A larger proportion of colorless flow melt flows downstream along the tapered surface on which it most directly impinges and a smaller proportion flows around the delivery means and thence downstream producing an uneven flow velocity across the cross-section of the colorless flow melt within the narrower section at the outlet. The colored flow melt emerges from the outlet of the delivery means encapsulated within the colorless flow melt and deflected towards but spaced apart from the defining wall of the narrower section.

According to the present invention, there are two embodiments of the novel feedblock useful in receiving and integrating the colorless and colored flow melts into a combined flow melt. The novel feedblock integrates the colorless and colored flow melts by encapsulating a continuous stream of the colored flow melt within the colorless flow melt.

One of the embodiments of the feedblock for encapsulating a flow melt of a colored thermoplastic material in a flow melt of a colorless thermoplastic material comprises a feedblock body having first and second inlets and an outlet. The feedblock body defines a first passageway extending from the first inlet to the outlet. The first passageway, however, is bifurcated into first and second sections within the feedblock body. The feedblock body also defines a second passageway extending from the second inlet to intersection with the first section. The second section intersects and rejoins the first section downstream of the intersection of the second passageway with the first section. The intersections of each of the second passageway and the second section with the first section being generally directional with respect to the first section.

Another embodiment of the feedblock for encapsulating a continuous flow melt of a colored thermoplastic material in a continuous flow melt of a colorless thermoplastic material comprises a feedblock body having first and second boreholes and a delivery means. The first borehole extends through the feedblock body from a first face to a second face, and has in sequence a larger section, a transition section, and a narrower section. The second borehole extends into the feedblock body from a third face thereof and generally transversely intersects and is in fluid connection with the first borehole at the transition section. The delivery means extends into the first borehole through the transition section and into the narrower section, and has an axially-directed delivery bore therethrough from an inlet to an outlet thereof wherein the outlet is positioned within the narrower section. The delivery means presents a tapered surface directed toward the second borehole. The tapered surface tapers inwardly toward the outlet, and extends from the transition section into the narrower section.

BRIEF DESCRIPTION OF THE DRAWINGS

The novel features of the present invention and the context within which they are set will be better understood upon reviewing the following specification together with the several drawings in which the same reference numbers are employed for the same parts in the various views and wherein:

FIG. 1 is an enlarged cross-sectional view of the zipper of the bag of FIG. 6 along line 1—1 rotated 90 degrees for ease of presentation;

FIG. 2 is an exploded, partly schematic isometric view of a feedblock in accordance with the present invention;

FIG. 12 is an enlarged cross-sectional fragmentary view of one of the structural plates making up the feedblock of FIG. 2 taken along line 2—2 with a portion of a next adjacent plate being shown in dotted outline, the feedblock being here shown assembled and having colored and colorless melts flowing therethrough:

FIG. 13 is a greatly enlarged cross-sectional fragmentary view of the structural plates and the colored and colorless flow melts flowing therethrough of FIG. 12 taken along line 13—13; and FIG. 14 is an enlarged cross-sectional fragmentary view of the last of the structural plates of the feedblock of FIG. 2 taken along line 14—14 with a portion of adjacent structural plate being shown in dotted outline, the feedblock being assembled and having colored and colorless melts flowing therethrough.

DETAILED DESCRIPTION OF THE INVENTION

Figure 8:
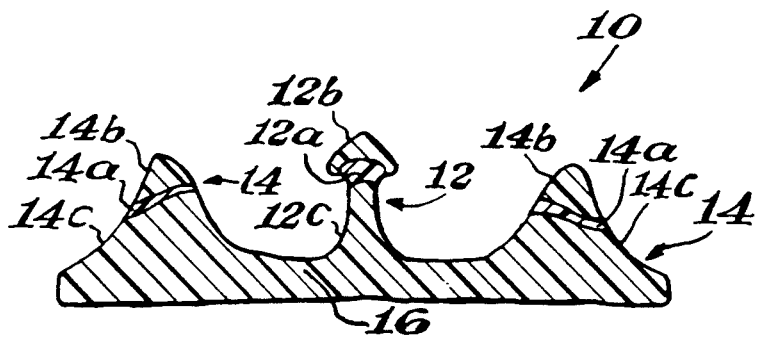
FIG. 8 is a cross-sectional view of a colored rib profile, the rib profile being a slightly larger version of the rib profile of the zipper of FIG. 1.
Figure 6:
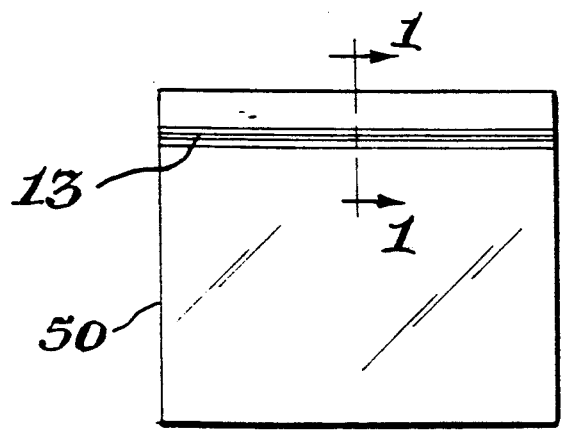
FIG. 6 is a front view of a thermoplastic reclosable bag having an interlocked zipper with portions of the rib profile being colored.

As indicated above, the apparatus of the present invention is useful in making zippers with colored portions for reclosable, thermoplastic bags. Such zippers and zipper profiles comprising same are known and are here illustrated in FIGS. 1, 6, and 8. The term "zipper profile" generically refers to either type of profile, rib (male) or groove (female). A rib profile for a reclosable, thermoplastic bag is referenced generally by the numeral 10, and is illustrated in FIGS. 1 and 8. Rib profile 10 is mated with an opposing groove profile 11 to form a zipper 13, which is seen in FIGS. 1 and 6. The positioning of zipper 13 about the top of a reclosable, thermoplastic bag 50 is further seen in FIG. 6. Zipper 13 is preferably continuous from one end of bag 50 to the other.

Referring to FIG. 1, rib profile 10 is comprised of a rib base 16, optionally one or more shoulders 14, and a rib 12. Rib 12 extends from rib base 16. Shoulders 14 extend from rib base 16, and are positioned on either or both sides of rib 12. Shoulders 14 provide structural support for profile 10 and convenient guidance for groove profile 11 when it is being interlocked with rib profile 10.

Referring to FIG. 8, rib 12 of rib profile 10 is seen to comprise an essentially continuous colored portion or regime 12a and essentially continuous colorless portions or regimes 12b and 12c. The colored portion 12a preferably comprises a smaller proportion of rib 12 by volume than colorless portions 12b and 12c taken together, and preferably extends laterally from one side of rib 12 to the other. Rib base 16 is preferably colorless.

Each of shoulders 14 comprises a colored portion 14a and colorless portions 14b and 14c. Colored portion 14a preferably comprises a smaller proportion of shoulder 14 by volume than colorless portions 14b and 14c, and preferably extends laterally from one side of shoulder 14 to the other.

Groove profile 11 is comprised of spaced-apart and generally parallel groove arms 17 and a groove base 19. Groove arms 17 are connected to and situated upon groove base 19, and are adapted to straddle and interlock wiht rib 12 as seen in FIG. 1. Groove profile 11 may be entirely colorless as seen in FIG. 1, or have in groove arms 17 a distribution of colored and uncolored portions (not shown) similar to those of rib profile 10 or may be entirely colored.

The term "colorless" as used herein refers to substantially transparent, clear, untinted, and uncolored thermoplastic materials. The term "colored" refers to thermoplastic material which is visually distinct from the thermoplastic material referred to as "colorless". Preferably, the colored thermoplastic material will comprise the colorless thermoplastic material and a compatible dye substance dispersed therein.

Suitable thermoplastic materials useful in the apparatus of the present invention include but are not limited to polyethylene, polypropylene, and polyester. Preferred thermoplastic materials include low density polyethylene, and linear low density polyethylene. This listing of suitable thermoplastic materials is representative and not to be construed as limiting.

Zipper profiles suitable for use in a zipper for a reclosable thermoplastic bag are typically manufactured in long, continuous strips and subsequently laminated or adhered to a separately extruded and shaped bag film web such as seen in U.S. Pat. No(s). 3,532,571 and 4,618,383 or extruded simultaneously with the greater bag film web.

An apparatus of the present invention suitable for making zipper profiles having distinct colored and colorless material regimes generally comprises means for providing a continuous flow melt of a colorless thermoplastic material, means for concurrently providing a continuous flow melt of a colored thermoplastic material, means for receiving and integrating the colorless and colored flow melts into a combined flow melt having distinct continuous material regimes, means for controllably initiating and terminating the flow of the colored melt to the integrating means without interrupting the flow of the colorless flow melt, and means for shaping the combined flow melt into a rib or groove profile. A preferred apparatus of the present invention suitable for making zipper profiles is represented schematically in FIG. 3.

The means for providing a continuous flow melt of a colorless thermoplastic material comprise a source of the colorless material, a primary extruder A capable of receiving and melting the colorless material and imparting a flow pressure thereto sufficient to transport it operatively through the receiving and integrating means and the die means, means (not shown) for feeding the colorless material to extruder A, and primary conduit means for conveying the colorless flow melt from primary extruder A to the receiving and integrating means. Primary conduit means preferably takes the form of a primary conduit 20 in fluid connection with extruder A for receiving and conveying the colorless flow melt, hereinafter referred to as colorless flow melt 80. A typical example of means for feeding the colorless material to primary extruder A is a gravity-fed feed hopper (not shown).

The means for concurrently providing a continuous flow melt of a colored thermoplastic material comprises a source of colored material, a secondary extruder B capable of receiving and melting the colored material and imparting a flow pressure thereto sufficient to transport it operatively through the receiving and integrating means and the die means, means (not shown) for feeding the colored material to secondary extruder B, secondary conduit means for conveying the colored flow melt from the secondary extruder to the receiving and integrating means. Secondary conduit means preferably takes the form of a secondary conduit 22a in fluid connection with extruder B for receiving and conveying the colored flow melt, and a secondary conduit 22b for receiving and transporting the colored flow melt wherein conduit 22b is in fluid connection with extruder B via conduit 22a and a dump valve C. The colored flow melt is hereinafter referred to as colored flow melt 82. A typical example of means for feeding the colored material to the secondary extruder B is a gravity-fed feed hopper (not shown).

The means for controllably initiating and terminating the flow of the colored flow melt 82 to the receiving and integrating means preferably comprises dump valve C, which is adapted to controllably direct colored flow melt 82 to or away from the receiving and integrating means. Dump valve C preferably takes the form of a three-way valve represented partly schematically in FIG. 4. Dump valve C can convey flow melt 82 from secondary conduit 22a to either secondary conduit 22b or diversion channel 36. Dump valve C has a rotatable valve plug 34. A 90 degree counterclockwise rotation of plug 34 from the position shown in FIG. 4 effects the diversion of colored flow melt 82 from secondary conduit 22a to diversion channel 36. Diversion and subsequent recycling of flow melt 82 permits extruder B to remain in operation without regard to the operating status of other process units. Colored flow melt 82 actually diverted via dump valve C may be stored, disposed of, or recycled. Colored flow melt 82 may be directed to or from the receiving and integrating means by dump valve C without interrupting the flow of colorless flow melt 80 to the receiving and integrating means. Thus, production of a zipper profile formed from colorless flow melt 80 may continue even though no colored flow melt 82 is being conveyed to the receiving and integrating means.

If termination of colored flow melt 82 to the integrating means is desired, diversion via dump valve C is preferred to the mere turning off or disengaging of extruder B because extruder B and secondary conduits 22a and 22b may continue to ooze melt due to residual pressure within them. The substantial reduction in oozing of colored flow melt 82 enhances the capability of quickly reducing the content of colored material in produced zipper profiles if bags incorporating such profiles need to be recycled for any reason. Thus, color contamination of newly produced bags by recycled bags is substantially reduced. Also, the ability to maintain operation of extruder B during recycle avoids undesirable thermoplastic material curing and buildup within extruder B.

Figure 7:
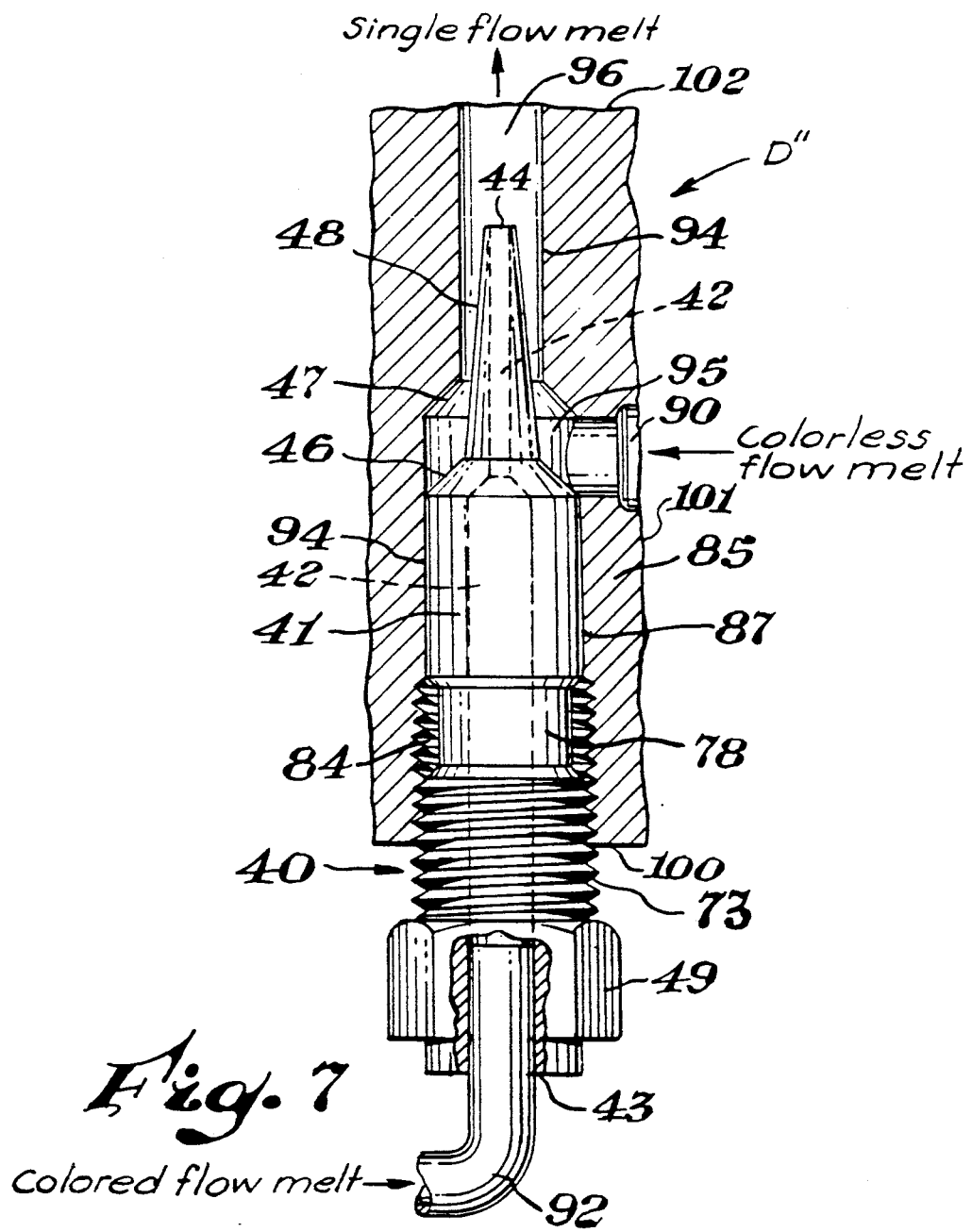
FIG. 7 is a front view of a second embodiment of a feedblock in accordance with the present invention partly in full and partly cut away and in section and with a segment of a secondary conduit.

The means for receiving and integrating the colored and colorless flow melts into a combined flow melt having distinct, continuous material regimes preferably comprises means for encapsulating the colored flow melt within the colorless flow melt to form a combined flow melt having distinct, continuous material regimes is a flow melt wherein the component colored and colorless flow melts are separate and substantially unmixed. In a combined flow melt 86 illustrated in FIG. 5, colored flow melt 82 is encapsulated in colorless flow melt 80. Combined flow melt 86 further has distinct, continuous material regimes that are separate and substantially unmixed in the form of flow melts 80 and 82. If the flow of colored flow melt 82 the receiving and integrating means is controllably interrupted or terminated diverted or directed away from the receiving and integrating means such as by dump valve C, then combined flow melt 86 is no longer formed. In that instance, the zipper profile is formed completely from colorless flow melt 80 once all remaining colored flow melt 80 is purged from the apparatus. The receiving and integrating means is preferably a feedblock D, which is illustrated schematically in FIG. 3. Preferred embodiments of feedblock D, feedblocks D' and D'', are illustrated in FIGS. 2 and 7, respectively.

The means for receiving and shaping the combined flow melt into a zipper profile (rib or groove) comprises an extrusion die E. Extrusion dies for thermoplastic materials are well known in the art, and are shown and described in and U.S. Pat. No. 4,419,159. Preferably, extrusion die E is configured to produce either or both of rib profile 10 and groove profile 11 seen in FIGS. 1 and 6.

A process of the present invention for making zipper profiles having distinct colored and colorless material regimes for the reclosable, thermoplastic bag generally comprises providing the continuous flow melt of the colorless thermoplastic material, concurrently providing the continuous flow melt of the colored thermoplastic material while controllably interrupting the flow thereof without interrupting the flow of the colorless flow melt, integrating the colorless and colored flow melts into a continuous combined flow melt having distinct, continuous, colored and colorless material regimes, and passing the combined flow melt through the die to continuously form the zipper profile.

Figures 4, 5:
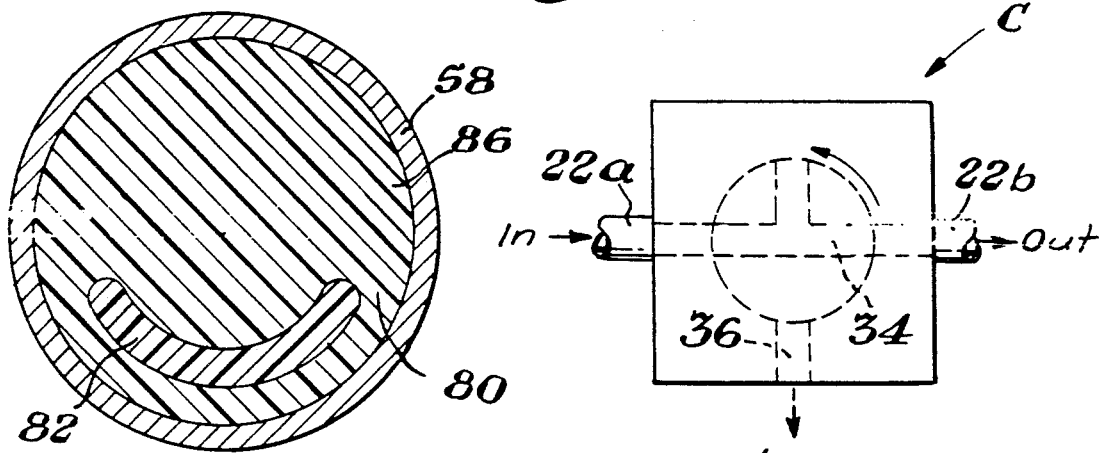
FIG. 4 is a semi-schematic representation of segments of a conduit having a dump valve in series therewith, the conduit leading from a secondary extruder to a feedblock.
FIG. 5 is a greatly enlarged cross sectional view along line 5—5 of FIG. 2 of a conduit having an encapsulated flow melt of a colored melt within a colorless melt.
Figure 3:
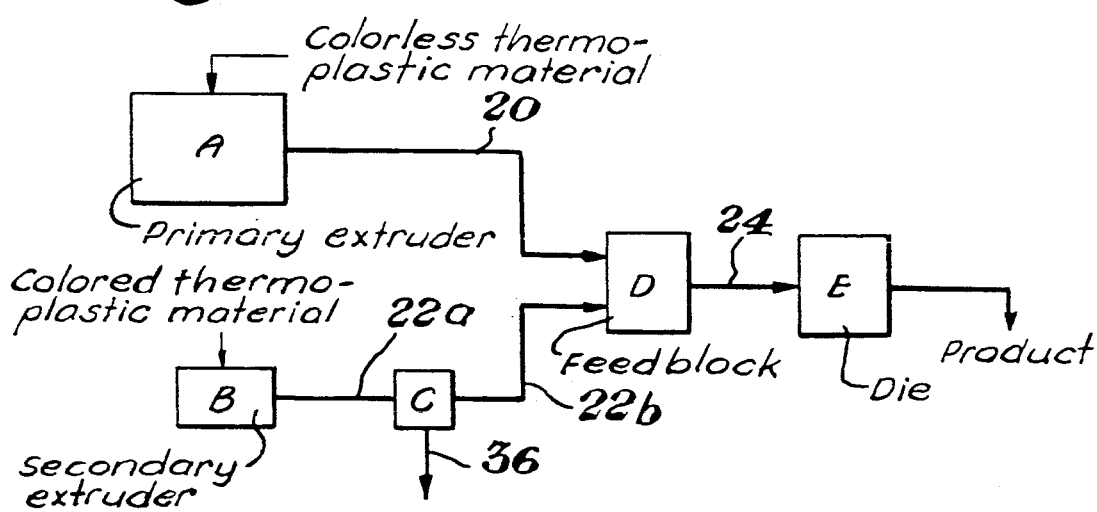
FIG. 3 is a schematic diagram of an apparatus for making a colored zipper profile in accordance with the present invention.

Referring to FIGS. 3 and 5, providing the continuous flow melt of the colorless thermoplastic material preferably comprises melting the colorless thermoplastic material to form colorless flow melt 80 and imparting a flow pressure thereto sufficient to transport flow melt 80 from extruder A through primary conduit 20, feedblock D, combined conduit 24, and die means E.

Concurrently providing the continuous flow melt of the colored thermoplastic material while controllably interrupting the flow thereof preferably comprises melting the colored thermoplastic material or dyeing melted colorless thermoplastic material to form colored flow melt 82 and imparting a flow pressure thereto sufficient to transport flow melt 82 from extruder B through secondary conduits 22a and 22b, dump valve C, feedblock D, combined conduit 24, and die means E and, alternately, through conduit 22a, dump valve C, and diversion channel 36. The flow of colored flow melt 82 to feedblock D may be controllably interrupted by rotating the rotatable valve plug 34 of dump valve C counterclockwise from the position shown in FIG. 4.

Integrating colorless and colored flow melts into a combined flow melt having distinct, continuous material regimes preferably comprises encapsulating the colored flow melt within the colorless flow melt.

The means for integrating the colored and colorless flow melts into a combined flow melt having distinct, continuous material regimes is preferably comprises means for encapsulating the colored flow melt within the colorless flow melt. A combined flow melt having distinct, continuous material regimes is a flow melt wherein the component colored and colorless flow melts are separate and substantially unmixed. The integrating means is preferably a feedblock D, which is illustrated schematically in FIG. 3. Preferred embodiments of feedblock D, feedblocks D' and D'', are illustrated in FIGS. 2 and 7, respectively.

As may be seen in the exploded and partly schematic view in FIG. 2, feedblock D' according to the present invention takes the form of stacked rectangular solid plates or feedblock structural plates, which form the body of the feedblock. These plates are identified in the view presented as 38a, 38b, 38c, and 38d, respectively, from the uppermost to the bottommost plate Plates 38a, 38b, 38c, and 38d have interconnecting bores and/or channels, variously, formed therethrough and/or therein to provide passageways for flow melts to correspond to the general scheme of feedblock D in FIG. 3. Structural plates 38a-38d preferably have smooth mating surfaces and are held together firmly, as by bolting, with bolts extending through the stack or by an enveloping frame, neither being shown to avoid complicating FIG. 2, and with or without cementing the structural plates together. In any event, it is desirable to provide a sufficiently smooth fit and enough compression throughout the stack to prevent leakage from the boreholes or channels through the plate junctures, so that the plates are sealingly joined or held. The boreholes each extend through a respective structural plate from face to face.

Feedblock D' has a first and a second inlet into the body of the feedblock for receiving colored and colorless flow melts and an outlet delivering the combined flow melt of the colored and colorless flow melts. The first inlet receives colorless flow melt, and is located at the intersection of conduit 78 and plate 38a. The second inlet receives colored flow melt, and is located at the intersection of conduit 76 and plate 38a. The outlet delivers the combined flow melt of colored and colorless flow melts, and is located at the intersection of conduit 58 and plate 38d.

Feedblock D' defines a first passageway extending from the first inlet to the outlet. The first passageway comprises a series of interconnecting bores and channels, and is bifurcated into a first and a second section. The first section comprises a channel 62, a bore 56, and a bore 54. The second section comprises a bore 61, a bore 63, a bore 64, a channel 65, and a bore 55. Feedblock D' further defines a second passageway, which extends from the second inlet and terminates at the first section. The second section rejoins and terminates at the first section downstream of the intersection or juncture of the second passageway and the first section.

Referring again to FIG. 2, it is seen that conduit 78, which corresponds in function to conduit 20 of the schematic diagram of FIG. 3, carries colorless flow melt 80, and is press-fitted within the walls of or otherwise sealingly connected to bore 61, which extends through plate 38a. Bore 61 is aligned with bore 63 that extends through next adjacent plate 38b. Bore 63 is aligned with bore 64 that extends through next adjacent plate 38c. Bore 64 intersects an end portion 65a of channel 65. Channel 65 is formed in the mating surface of plate 38d in the nature of a groove, and extends to and terminates in a second recessed port 35. Port 35 is a wider and shallower portion of channel 65, and partly surrounds and generally opens about a plane and generally radially intersects bore 55 extending through plate 38d. The intersection between port 35 and bore 55 is referred to as intersection 39. Port 35 preferably surrounds and intersects bore 55 about along an arc of about 180 degrees.

Channel 62, in the nature of a groove formed in the surface of plate 38b that mates with plate 38a, extends from bore 63, and extends to bore 56 in plate 38b and intersects thereto. Bore 56 is aligned with bore 54 which extends through a next adjacent plate 38c. Bore 54 is aligned with bore 55 of next adjacent plate 38d. Combined conduit 58, which corresponds in function to conduit 24 of the schematic diagram of FIG. 3, is press-fitted within the walls of or otherwise sealingly connected to bore 55.

Conduit 76, which corresponds in function to conduit 22b in the schematic diagram of FIG. 3, carries colored flow melt to feedblock D', and is seen to be press-fitted within the walls of or otherwise sealingly connected to a bore 51, which extends through plate 38a. Bore 51 is aligned with a bore 52 of next adjacent plate 38b. Bore 52 intersects with an end portion 53a of a channel 53, channel 53 being in the nature of a groove formed in the surface of plate 38c that mates with plate 38b. Channel 53 extends to and terminates at a first recessed port 33. Port 33 is a wider and shallower portion of channel 53, and partly surrounds and generally opens about a plane and generally radially intersects bore 54 of plate 38c. Port 35 preferably surrounds and intersects bore 54 along an arc less than that of intersection 37, and more preferably of about 120 degrees. The intersection between port 33 and bore 54 is referred to as intersection 37. Intersections 37 and 39 are preferably generally directional, that is opening or pointing in generally the same direction, with respect to the first section. Thus, the first section may be generally straight or not straight, and intersections 37 and 39 will open or point in generally the same direction with respect to the first section itself. Intersections 37 and 39 are further preferably generally vertically aligned and generally parallel with respect to direction of intersection.

Bore 63 and channel 62, which extends from bore 63 to bore 56, provide for division the stream of colorless flow melt 80 into two separate streams, one referred to as major stream 80a (not shown in FIG. 2), which enters channel 62, and minor stream 80b (not shown in FIG. 2), which continues through bore 63. Major and minor streams 80a and 80b are reunited in bore 55 as seen in FIGS. 2 and 14. Preferably, major stream 80a comprises a greater proportion of flow melt 80 than minor stream 80a.

FIG. 12 illustrates the juncture of bores 54 and 56 and port 33 in section when structural plates 38a, 38b, 38c, and 38d are stacked and connected together and when both colored flow melt 82 and major stream 80a are engagedly flowing therethrough. Colored flow melt 82 enters bore 54 at a pressure sufficient to provide a peripheral portion of same within bore 54 as major stream 80a passes therethrough. The peripheral portion is preferably adjacent to the boundary wall of plate 38c defined by bore 54. FIG. 13 illustrates a cross-sectional view of bore 54 with colored and colorless melts 82 and 80a flowing therethrough.

FIG. 14 illustrates in a view in section the juncture of bores 54 and 55 and port 35, and the lateral junction therewith of recessed port 35 when structural plates 38a, 38b, 38c, and 38d are stacked and connected together and when both colored flow melt 82 and major and minor streams 80a and 80b of the colorless flow melt are engagedly flowing therethrough. Minor stream 80b flows through bore 63, bore 64, and channel 65, including port 35, into bore 55 at a pressure sufficient to provide a peripheral portion of same within bore 55 as the integrated colored and colorless flow melts 82 and 80a pass therethrough from bore 54. Minor stream 80b flows preferably adjacent to the boundary wall of plate 38d defined by bore 55.

FIG. 5 illustrates the desired encapsulated form of a combined flow melt 86 exiting feedblock D' via conduit 58, which corresponds in function to conduit 24 of the schematic diagram of FIG. 3. The term encapsulation refers to two-dimensional encapsulation within a conduit, bore, or channel. Since the velocity profile of a thermoplastic flow melt approaches zero at along a surface, positioning colored flow melt 82 away from a conduit, bore wall, or other surface allows the colored flow melt to be transported through feedblock D', conduit 58, and the die more quickly. Thus, when recycle of the zippered bag film web is desired, the colored flow melt may be purged more quickly from the greater zipper-making apparatus.

A process for encapsulating a flow melt of a colored thermoplastic material in a flow melt of a colorless thermoplastic material according to the present invention comprises providing a stream of colorless flow melt 80, providing a stream of colored flow melt 82, dividing the stream of colorless flow melt 80 into major stream 80a and minor stream 80b, each having a perimeter defined by a fluid passageway having a defining wall, directing the stream of colored flow melt 82 into major stream 80a of colorless flow melt along a portion of the perimeter thereof contiguous to the defining wall of the fluid passageway therefor, and thereafter directing minor stream 80b of colorless flow melt into major stream 80a along a portion of the perimeter thereof and contiguous to and between the stream of colored melt 82 therein and the defining wall of the fluid passageway for major stream 80a. Major stream 80a and minor stream 80b are divided in plate 38b between channel 62 and bore 63. For major stream 80a, fluid passageways having a defining wall take the form of channel 62, bore 56, bore 54, and bore 55. For minor stream 80b, fluid passageways having a defining wall take the form of bore 63, bore 64, and channel 65. The stream of colored flow melt 82 is directed into major stream 80a at bore 54 along a portion of the perimeter of stream 80a contiguous to the wall of bore 54. Minor stream 80b is directed into the stream of major stream 80a and colored flow melt 82 along the portion of the perimeter thereof and contiguous to and between the regime of colored flow melt 82 therein and the wall of bore 55 to form combined flow melt 86, the configuration of which is shown generally in FIG. 5.

Referring to FIG. 7, Feedblock D" according to the present invention is seen to have a different structure and to operate in a somewhat different manner than feedblock D'; however, feedblock D" is adapted to forming a combined flow melt of colored and colorless flow melts 86 in an encapsulated configuration such as combined flow melt 86 as feedblock D'. Feedblock D" is formed substantially from a feedblock body defining various bores, cavities, and channels therein as well as means for regulating flow of the colored and colorless flow melts therethrough, and is particularly suited for integration in a blown film process.

Feedblock D" is shown for the sake of simplicity as a fragmentary view of a larger block which may comprise two or more Feedblocks D" or other components such as an extrusion mandrel and die shaping means for the zipper profiles and the greater bag film. The larger block defines various exterior faces along its boundaries (not shown). Various components of the larger block such as Feedblock D" may define nonspecific boundaries between themselves and other components of the larger feedblock. These nonspecific boundaries may be indicated by fragmentary lines such as those seen in FIG. 7. Whether Feedblock D" is defined at its periphery by an exterior face of the larger block or a nonspecific boundary between it and another component of the larger block, such exterior faces or nonspecific boundaries are collectively referred to as faces.

Feedblock D" comprises a feedblock body 85 and a delivery means 40. A first borehole 94 extends through body 85 from a first face 100 of body 85 to a second face 102 of body 85 as seen in FIG. 7. Feedblock body 85 has an internally threaded section 84, a larger section 87, a transition section 95 adjacent the intersection with a connecting second borehole 90, and a narrower section 96 extending from section 95. Borehole 90 extends from a third face 101 and intersects with, and is in fluid connection with borehole 94 preferably in a generally perpendicular or transverse direction to borehole 94 at transition section 95. Second borehole 90 communicates with a source, preferably a conduit (not shown) such as conduit 20 shown schematically in FIG. 3 from which colorless flow melt is supplied to borehole 90.

Delivery means 40 may extend into borehole 94, through threaded and larger sections 84 and 87, through transition section 95, and into narrower section 96. Delivery means 40 communicates with a source of colored flow melt such as secondary conduit 92, which corresponds to secondary conduit 22b in the schematic diagram of FIG. 3. Delivery means 40 supplies colored flow melt to borehole 94.

Delivery means 40 comprises an externally threaded portion 73, a larger shank portion 41, a smaller shank portion 78, a tapered portion 46, and a nozzle portion 48. Portions 73, 78, 41, 46, and 48 are preferably connected sequentially, and, further preferably, are formed from a unitary piece. Nozzle portion 48 is preferably tapered, and has a delivery outlet 44 at one end shown extending into narrower portion 96 in FIG. 7.

Shank portion 41 extends substantially within larger section 87 of borehole 94, and is slideable and substantially leakproof therebetween. Externally threaded portion 73 is threadingly and intermatingly coextensive with internally threaded section 84 of feedblock body 85 and may extend partially or totally therein.

Delivery means 40 further preferably comprises a tool-engaging means for adjusting the position of means 40 within feedblock body 85. Such tool-engaging means preferably comprises a terminal body portion 49 that is polygonal, i.e. hexagonal, in its exterior shape to allow positional adjustment of delivery means 40 within body 85 by rotation of portion 49. Portion 49 is preferably integrally formed with threaded portion 73, and does not extend within feedblock body 85.

Transition section 95 preferably has a tapered seat 47 adjacent narrower section 96. Seat 47 is matingly coextensive with tapered portion 46. When tapered portion 46 is brought in face to face contact with seat 47 by rotation of terminal body portion 49, any flow through transition section 95 from borehole 90 to narrow section 96 is terminated or not initiable. When delivery means 40 is biased away from such face to face contact with seat 47 such as in the position indicated in FIG. 7, flow is possible through transition section 95. It is seen that delivery means 40 may be adjusted to regulate the extent of flow of the colorless flow melt 80 from borehole 90 through transition section 95 to narrower section 96. When the supply of colored flow melt 82 to borehole 94 is reduced during product bag recycle, the position of delivery means 40 within transition section 45 and borehole 94 may be lowered to allow increased flow throughput of colorless flow melt 80 within section 45 to compensate for the reduction in flow throughput of colored flow melt 80 so that the zipper profile formed remains of substantially uniform size.

Figure 11:
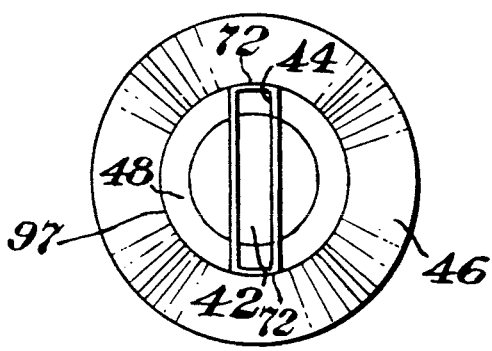
FIG. 11 is an end view of the delivery means of FIG. 10.
Figure 10:
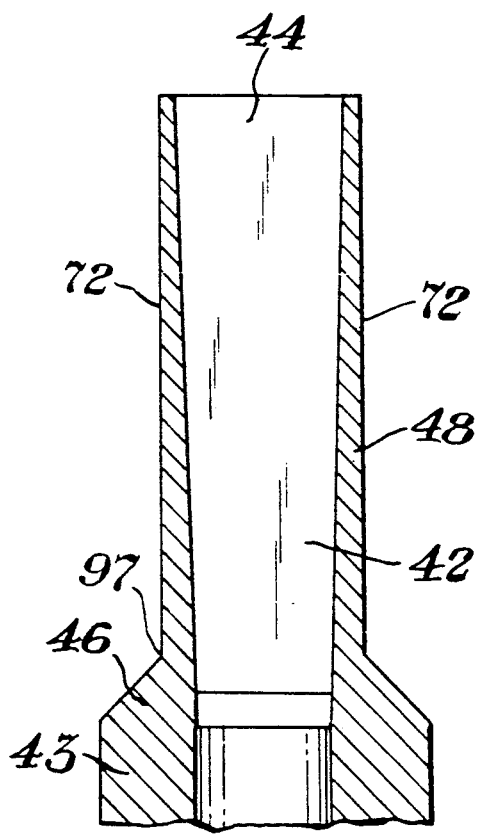
FIG. 10 is a fragmentary cross-sectional view of the delivery means of FIG. 9 taken along line 10—10.
Figure 9:
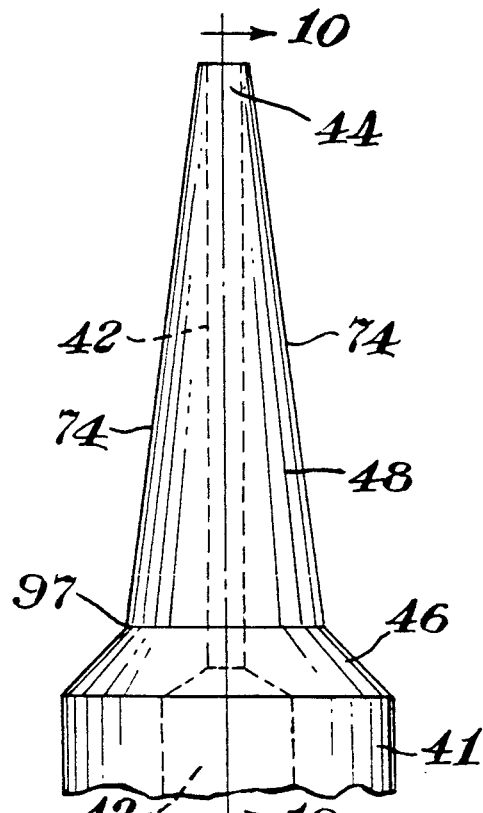
FIG. 9 is an enlarged fragmentary view of the delivery means of the feedblock of FIG. 7 in accordance with the present invention.

Delivery means 40 has an delivery bore 42 extending longitudinally therethrough from an inlet 43 to an outlet 44 preferably in about the axial center of means 40. Bore 42 is preferably round from inlet 43 to tapered portion 46, where it preferably changes to a generally rectangular shape and continues through portion 48 to outlet 44 as seen in FIGS. 9, 10, and 11. Preferably, the major dimension of the rectangular dimension of bore 42 gradually increases as bore 42 extends from tapered portion 46 to outlet 44. Though the shape of outlet 44 is preferably rectangular, it may be arcuate. A secondary conduit 92 may be press-fitted into bore 42 or otherwise connected thereto in a manner as to be retentionally and rotationally coextensive therein or thereto and substantially leakproof therein. Secondary conduit 92 provides colored flow melt to bore 42, and corresponds functionally to secondary conduit 22b seen in the schematic diagram of FIG. 3.

Nozzle portion 48 is illustrated in various views in FIGS. 9, 10, and 11. Portion 48 as seen in FIG. 11 is generally circular at and in proximity to interface 97, and tapers into the generally rectangular configuration of outlet 44. From interface 97 to the minor dimension of the rectangular configuration of outlet 44 of portion 48, portion 48 preferably does not taper as seen in FIG. 9. Thus, portion 48 has oppositely situated, relatively broad and generally planar, generally tapered surfaces 74, and has oppositely situated, relatively narrow and generally planar, generally untapered surfaces 72. Surfaces 74 and surfaces 72 extend from interface 97 to outlet 44. Surfaces 74 taper inwardly from interface 97 to outlet 44. Delivery means 40 is preferably positioned within feedblock body 85 such that delivery outlet 44 is in alignment with the axial center of narrower section 96.

Delivery means 40 is positioned within feedblock body 85 such that preferably surfaces 74 and further preferably the tapered outer surfaces of section 95 are presented toward borehole 90. The surface areas of delivery means 40, including surfaces 74, presented toward borehole 90 are referred to as the front side of delivery means 40, and the surface areas on the side of delivery means 40 generally opposite that of the front side are referred to as the back side.

The diameter or dimension (width) of borehole 94 at transition section 95 and the diameter or dimension (width) of tapered portion 46 and delivery portion 48 transverse to the longitudinal extension of borehole 90 are of a size relationship resulting a relatively larger proportion of colorless flow melt 80 contacting the front side of delivery means 40 and being substantially diverted into narrower section 96 along the front side of delivery means 40. The size relationship also results in a relatively smaller proportion of colorless flow melt 80 flowing around the front side of delivery means 40 to the back side where it is forced into narrower section 96 generally along the back side of delivery means 40. The closer the width of tapered portion 46 and delivery portion 48 is to that of transition section 95, the greater the proportion of flow melt 80 will be diverted into narrower section 96 along the front side of delivery means 40, including portion 48. In the preferred embodiment shown in FIG. 7, the width of tapered broad sides 74 or nozzle portion 48 positioned in transition section 46 is less than the diameter of section 46, but is of sufficient width to effect the desired proportionation of flow of colorless melt 80 into narrower section 96. The proportionation of flow of flow melt 80 into narrower section 96 results in an uneven flow velocity profile wherein flow is faster in the area of section 96 adjacent the front sides of delivery means 40 than in the area adjacent the back sides of means 40. The uneven flow velocity profile eventually dissipates at a point within section 96 downstream of outlet 44 of delivery means 40.

Delivery means 40 is adapted to deliver colored flow melt 82 into narrower section 96, thus effecting encapsulation of flow melt 82 within colorless flow melt 80 passing thereby. Delivery means 40 receives flow melt 82 from secondary conduit 92, and delivers it through bore 42 and out of delivery outlet 44 into narrower section 96. Preferably, flow melt 82 is delivered into section 96 in a rectangular configuration evidenced by the rectangular shape of outlet 44 shown in FIG. 11. Delivery means 40 is adapted to provide the uneven flow velocity profile described above and to deliver colored flow melt 82 in colorless flow melt 80 such that the resulting combined flow melt 86 will have a cross-section wherein the regime of colored flow melt 82 is adjacent but not contiguous to the area of the wall of section 96 adjacent to or facing the back side of delivery means 40. In other words, a cross-section of combined flow melt 86 is provided wherein the regime of colored flow melt 82 is between the axial center and the defining wall of section 96. One possible configuration of the cross-section of combined flow melt 86 within section 96 corresponds to the cross-section of flow melt 86 in conduit 58 of feedblock D' seen in FIG. 5. FIG. 5 shows the regime of colored flow melt 82 adjacent to but not contiguous to the defining wall of conduit 58. FIG. 5 further shows the regime of colored flow melt 82 in an arcuate configuration.

A process for encapsulating a flow melt of a colored thermoplastic material in a flow melt of a colorless thermoplastic material according to the present invention wherein the regime of colored flow melt is adjacent and spaced-apart from but not contiguous to the periphery or boundary wall of the combined flow melt.

In the process corresponding to feedblock D', the process comprises delivering a stream of colorless flow melt 80 from second borehole 90 generally transversely into first borehole 94 at transition section 95 and subsequently into narrower section 96 and simultaneously discharging or delivering a stream of colored flow melt 82 in narrower section 96 within the stream of colored flow melt 80. A relatively larger proportion of flow melt 80 impinges or contacts tapered portion 46 and/or tapered surface 74 on the front side of delivery means 40 within transition section 95 and flows into narrowed section 96 generally along and between that tapered surface 74 and the portions of the wall of narrower section 96 faced by that tapered surface 74. A relatively smaller proportion of flow melt 80 flows around and surrounds the portions of delivery means 40, including tapered portion 46 and lower portions of delivery portion 48, positioned within transition section 95, and subsequently flows into narrower section 96 generally along and between tapered surface 74 of the back side of delivery means 40 and the portions of the wall of narrower section 96 faced by that tapered surface 74. The greater flow velocity of flow melt 80 between tapered surface 74 at the front side of delivery means 40 and the portions of the wall of narrower section 96 faced by that side 74 forces the regime of colored flow melt 82 being delivered or discharged in about the axial center of section 96 toward and adjacent to but not contiguous to the wall of section 96 generally faced by tapered surface 74 at the back side of delivery means 40 at some point downstream where the uneven flow velocity profile dissipates into an even profile. Preferably, the rectangular shape of colored flow melt 82 delivered or discharged at outlet 44 becomes arcuate in cross-section within narrower section 96 as a result of the uneven flow velocity profile of combined flow melt 86 across the cross-section of section 96.

It will be understood that the various conduits, boreholes, and channels of Feedblocks D' and D" are interchangeable in form and functionally equivalent (e.g. conduits may readily be substituted for bores or channels and bores or channels may be substituted for conduits).

It will be appreciated that extruding the colored and colorless flow melts in separate extruders, encapsulating the colored flow melt in the colorless flow melt prior to shaping of the combined flow melt in the die, and placement of the dump valve between extruder for the colored flow melt and the feedblock to terminate or divert the flow of the colored melt are additive and non-cooperating methods of reducing color contamination in the production of colored zipper profiles and thermoplastic reclosable bags; therefore, it will be appreciated that any one or more of the novel apparatuses for effectuating such methods of reduction may be integrated into a colored zipper profile manufacturing process independently of the others.

A significant aspect of the apparatus and process of the present invention is that colorless thermoplastic material sufficient to make the zipper file is provided at all times—even when the supply of colored thermoplastic material is shut off.

While the preferred embodiments of the greater apparatus for manufacturing colored zipper profiles for reclosable thermoplastic bags, the dump valve, and the feedblocks have been shown with regard to specific details, it will be appreciated that depending upon the manufacturing process and the manufacturers' desires, the invention may be modified by various changes while still being fairly within the scope of the novel teachings and principles hereof.

What is claimed is:

1. Apparatus for making a zipper profile having distinct colored and colorless material regimes for a zipper for a reclosable, thermoplastic bag, comprising:
   (a) means for providing a continuous flow melt of a colorless thermoplastic material;
   (b) means for concurrently providing a continuous flow melt of a colored thermoplastic material;
   (c) means for receiving and integrating the colorless and colored flow melts into a continuous combined flow melt having distinct, continuous material regimes wherein the colored flow melt if entirely encapsulated within the colorless flow melt with substantially no intermixing of the colorless flow melt with the colorless flow melt;
   (d) means for controllably initiating and terminating the flow of the colored melt to the receiving and integrating means without interrupting the flow of the colorless flow melt comprising a dump valve, the dump valve being adapted to controllably direct the flow melt to or away from the receiving and integrating means; and
   (e) die means for receiving and shaping the combined flow melt into the zipper profile.

2. The apparatus of claim 1, wherein the means for providing a continuous flow melt of a colorless thermoplastic material comprises:
   (a) a primary extruder, the primary extruder being capable of imparting to the colorless flow melt a flow pressure sufficient to transport it operatively through the receiving and integrating means and the die means; and
   (b) a primary conduit means for conveying the colorless flow melt from the primary extruder to the receiving and integrating means.

3. The apparatus of claim 1, wherein the means for providing a flow melt of a colored thermoplastic material comprises:
   (a) a secondary extruder being capable of imparting to the colored flow melt a flow pressure sufficient to transport it operatively through the receiving and integrating means and the die means; and
   (b) a secondary conduit means for conveying the colored flow melt from the secondary extruder to the receiving and integrating means.

4. A process for making a zipper profile having distinct colored and colorless material regimes for a zipper for a reclosable, thermoplastic bag, comprising:
   (a) providing a continuous flow melt of a colorless thermoplastic material;
   (b) concurrently providing a continuous flow melt of a colored thermoplastic material while controllably interrupting the flow thereof;
   (c) integrating the colorless and colored flow melts into a continuous combined flow melt having distinct, continuous, colored and colorless material regimes without interrupting the flow of the colorless flow melt with colored flow melt being entirely encapsulated within the colorless flow melt with no substantial intermixing of colored flow melt with colorless flow melt; and
   (d) passing the combined flow melt through a die to continuously form the zipper profile.

5. The process of claim 4, wherein the flow of the colored flow melt when interrupted is diverted away from the integration into the combined flow melt.

6. A feedblock for encapsulating a flow melt of a colored thermoplastic material in a flow melt of a colorless thermoplastic material, comprising: a feedblock body having first and second inlets and an outlet, the feedblock body defining a first passageway extending from the first inlet to the outlet, the first passageway being bifurcated into first and second sections within the feedblock body, the feedblock body defining a second passageway extending from the second inlet to intersection with the first section, the second section intersecting and rejoining the first section downstream of the intersection of the second passageway with the first section, and the intersections of each of the second passageway and the second section with the first section being generally directional with respect to the first section.

7. The feedblock of claim 6, wherein the second passageway terminates in a first port adjacent its intersection with the first section, the first port being wider and shallower than other portions of the second passageway, the first port generally radially intersecting the first section, the second section terminating in a second port adjacent its intersection with the first section, the second port being wider and shallower than other portions of the second section, and the second section generally radially intersecting the first section.

8. The feedblock of claim 7, wherein the respective directions of radial intersection of first and second ports with the first section are generally parallel.

9. A process for encapsulating a flow melt of a colored thermoplastic material in a flow melt of a colorless thermoplastic material, comprising:
   (a) providing a continuous stream of the colorless flow melt;
   (b) providing a continuous stream of the colored flow melt;
   (c) dividing the stream of colorless flow melt into a major stream and a minor stream, each having a perimeter defined by a fluid passageway having a defining wall;
   (d) directing the stream of colored flow melt into the major stream of colorless flow melt along a portion of the perimeter thereof contiguous to the defining wall of the fluid passageway therefor; and thereafter
   (e) directing the minor stream of colorless flow melt into the major stream along a portion of the perimeter thereof and contiguous to and between the stream of colored melt therein and the defining wall of the fluid passageway for the major stream so as to encapsulate the colored flow melt within the colorless flow melt.

10. A feedblock for encapsulating a flow melt of a colored thermoplastic material in a flow melt of a colorless thermoplastic material, comprising:
   (a) a feedblock body having a first borehole extending therethrough from a first face to a second face, the first borehole having in sequence a larger section, a transition section, and a narrower section, the feedblock body having a second borehole extending thereinto from a third face thereof and generally transversely intersecting and in fluid connection with the first borehole at the transition section; and
   (b) a delivery means extending into the first borehole through the transition section and into the narrower section, the delivery means having an axially-directed delivery bore therethrough from an inlet to an outlet thereof, the outlet being positioned within the narrower section, the delivery means presenting a tapered surface directed toward the second borehole, the tapered surface tapering inwardly toward the outlet, the tapered surface extending from the transition section into the narrower section.

11. The feedblock of claim 10, wherein the first borehole further comprises an internally threaded section, the delivery means further being comprised of an externally threaded portion and a tool-engaging means for rotating the delivery means to allow positional adjustment within the first borehole, the externally threaded portion being threadingly and intermatingly coextensive with the internally threaded section.

12. The feedblock of claim 10, wherein the delivery means has a nozzle portion, the nozzle portion carrying the outlet and the tapered surface, the width of the nozzle portion transverse to the longitudinal extension of the second borehole being less than the corresponding width of the transition section.

13. The feedblock of claim 10, wherein the delivery means presents a pair of oppositely situated tapered surfaces.

14. The feedblock of claim 10, wherein the outlet has a rectangular configuration.

15. The feedblock of claim 10, wherein the outlet has an arcuate configuration.

16. The process for encapsulating a flow melt of a colored thermoplastic material in a flow melt of a colorless thermoplastic material, comprising:

(a) delivering a stream of the colorless flow melt from a second borehole into a transition section of a first borehole and thence into and through a narrower section thereof, the second borehole intersecting the first borehole generally transversely:

(b) while simultaneously discharging a stream of the colored flow melt from an outlet of a delivery means positioned within the stream of colorless flow melt, the delivery means extending downstream through the transition section into the narrower section, the colorless flow melt flowing transversely into the transition section and impinging upon the delivery means, flowing around and entirely surrounding the delivery means as the flow melt traverses the first borehole;

(c) the delivery means being inwardly tapered along a portion of its length to the outlet thereof and positioned to present a tapered surface to the flow of colorless flow melt directed into said transition section from the second borehole whereby a larger proportion of colorless flow melt flows downstream along the tapered surface on which it impinges and a smaller proportion flows around the delivery means and thence downstream producing an uneven flow velocity across the cross-section of the colorless flow melt within the narrower section at the outlet, thereby the colored flow melt emerging from the outlet of the delivery means being deflected towards but spaced apart from the wall of the narrower section.

* * * * *

UNITED STATES PATENT AND TRADEMARK OFFICE
CERTIFICATE OF CORRECTION

PATENT NO. : 5,066,444
DATED : November 19, 1991
INVENTOR(S) : R. Douglas Behr

It is certified that error appears in the above-identified patent and that said Letters Patent is hereby corrected as shown below:

Column 15, line 17, "if" should correctly read --is--.

Column 16, line 3, followiong the first occurrence of "the", insert --integrating means through a dump valve thus preventing--.

Signed and Sealed this

Sixth Day of April, 1993

Attest:

STEPHEN G. KUNIN

Attesting Officer

Acting Commissioner of Patents and Trademarks